United States Patent
Chiu

(10) Patent No.: US 8,579,320 B2
(45) Date of Patent: Nov. 12, 2013

(54) FOLDING TOOL STAND

(71) Applicant: Rexon Industrial Corp., Ltd., Taichung (TW)

(72) Inventor: Cheng-Hung Chiu, Taichung (TW)

(73) Assignee: Rexon Industrial Corp., Ltd., Taichung (TW)

( * ) Notice: Subject to any disclaimer, the term of this patent is extended or adjusted under 35 U.S.C. 154(b) by 0 days.

(21) Appl. No.: 13/784,236

(22) Filed: Mar. 4, 2013

(65) Prior Publication Data

US 2013/0175791 A1 Jul. 11, 2013

Related U.S. Application Data

(63) Continuation of application No. 12/603,607, filed on Oct. 22, 2009, now Pat. No. 8,464,994.

(60) Provisional application No. 61/159,271, filed on Mar. 11, 2009, provisional application No. 61/144,317, filed on Jan. 13, 2009.

(30) Foreign Application Priority Data

Oct. 22, 2008 (TW) .............................. 97140550 A
Mar. 11, 2009 (TW) .............................. 98107949 A

(51) Int. Cl.
*B62B 1/12* (2006.01)

(52) U.S. Cl.
CPC ...................................... *B62B 1/12* (2013.01)
USPC .......................................... 280/652; 248/439

(58) Field of Classification Search
CPC ....................................................... B62B 1/12
USPC ............ 280/30, 35, 639, 649, 651, 652, 654, 280/43.1, 43.11, 47.131, 47.17, 47.18, 280/47.23, 47.24, 47.27, 47.28; 248/439; 144/253.8, 286.1, 286.5, 287; 83/157, 83/471; 269/17
See application file for complete search history.

(56) References Cited

U.S. PATENT DOCUMENTS

| | | | |
|---|---|---|---|
| 2,096,994 A | 10/1937 | Millen | |
| 2,318,945 A | 5/1943 | Johannsen | |
| 2,372,003 A | 3/1945 | Kennedy | |
| 2,662,566 A * | 12/1953 | Kurschner | 144/286.5 |

(Continued)

FOREIGN PATENT DOCUMENTS

| | | |
|---|---|---|
| CN | 2573185 | 9/2003 |
| DE | 26 45 773 A1 | 4/1978 |

(Continued)

*Primary Examiner* — John R Olszewski
*Assistant Examiner* — Jacob Meyer
(74) *Attorney, Agent, or Firm* — Bacon & Thomas, PLLC

(57) ABSTRACT

A folding tool stand includes a platform connected to a base frame. The platform is pivotally and slidingly connected at a first side thereof to the base frame and is pivotally connected at a second side thereof to links that are pivotally connected to the base frame. A leg support is pivotally connected to the base frame. A locking device is provided to maintain the platform in an extended position. In the collapsed position, the platform is guided by the links to be positioned along the base frame. In the extended position, the links guide and support the platform in a position spaced from the base frame. In an alternate embodiment, a driving device is used to provide support to the second side of the platform during expanding and collapsing of the folding tool stand.

18 Claims, 9 Drawing Sheets

(56) References Cited

U.S. PATENT DOCUMENTS

| | | | |
|---|---|---|---|
| 2,880,047 A | 3/1959 | Haag | |
| 2,980,200 A | 4/1961 | Kibby | |
| 3,008,463 A * | 11/1961 | Frank | 126/9 R |
| 3,655,212 A | 4/1972 | Krass et al. | |
| 3,669,031 A * | 6/1972 | Cole | 108/102 |
| 3,783,799 A | 1/1974 | Dupuis | |
| 3,930,663 A | 1/1976 | Scripter | |
| 4,079,679 A | 3/1978 | Bechtold | |
| 4,144,822 A | 3/1979 | Roberts et al. | |
| D252,197 S * | 6/1979 | Gale | D34/21 |
| 4,202,284 A | 5/1980 | Parsons, Sr. | |
| 4,230,329 A * | 10/1980 | Johnson | 280/43.17 |
| 4,284,286 A * | 8/1981 | Lewallen | 280/30 |
| 4,369,985 A * | 1/1983 | Bourgraf et al. | 280/641 |
| 4,373,761 A * | 2/1983 | Hansberry, Jr. | 312/249.12 |
| 4,483,524 A | 11/1984 | Basten et al. | |
| 4,483,573 A * | 11/1984 | Keller | 312/281 |
| 4,558,648 A | 12/1985 | Franklin et al. | |
| 4,561,622 A | 12/1985 | Heinzel | |
| 4,565,382 A * | 1/1986 | Sherman | 280/47.18 |
| 4,611,823 A | 9/1986 | Haas | |
| 4,726,405 A * | 2/1988 | Bassett | 144/287 |
| 4,728,118 A | 3/1988 | Haas | |
| 4,934,718 A * | 6/1990 | Voegele | 280/30 |
| 4,955,450 A * | 9/1990 | Deinlein-Kalb et al. | 180/199 |
| 4,967,450 A * | 11/1990 | Adkins et al. | 24/3.11 |
| 4,967,672 A | 11/1990 | Leather | |
| 4,969,496 A * | 11/1990 | Romans | 144/286.1 |
| 5,005,847 A * | 4/1991 | King et al. | 280/47.19 |
| 5,014,628 A | 5/1991 | Roberts | |
| 5,067,535 A * | 11/1991 | Wolff | 144/286.1 |
| 5,087,013 A | 2/1992 | Gress et al. | |
| 5,109,778 A | 5/1992 | Berkowitz et al. | |
| 5,154,441 A * | 10/1992 | White et al. | 280/645 |
| 5,161,590 A * | 11/1992 | Otto | 144/286.5 |
| 5,193,598 A * | 3/1993 | Estrem | 144/286.1 |
| 5,224,531 A * | 7/1993 | Blohm | 144/285 |
| 5,231,905 A * | 8/1993 | Trahan | 83/439 |
| 5,255,724 A * | 10/1993 | Butke | 144/329 |
| 5,269,545 A * | 12/1993 | Huebschen et al. | 280/47.35 |
| 5,323,713 A | 6/1994 | Luyk et al. | |
| 5,325,640 A | 7/1994 | Luedke et al. | |
| 5,379,815 A | 1/1995 | Brazell et al. | |
| 5,421,272 A | 6/1995 | Wilmore | |
| 5,423,561 A * | 6/1995 | Sadow | 280/37 |
| 5,454,575 A | 10/1995 | Del Buono | |
| 5,560,582 A * | 10/1996 | Beelen | 248/588 |
| 5,603,491 A | 2/1997 | Murrell | |
| 5,606,922 A | 3/1997 | Adams et al. | |
| 5,638,761 A | 6/1997 | Berkowitz et al. | |
| 5,642,898 A * | 7/1997 | Wise | 280/652 |
| 5,816,374 A | 10/1998 | Hsien | |
| 5,862,898 A | 1/1999 | Chang | |
| 5,863,052 A * | 1/1999 | Roman | 280/30 |
| 5,934,641 A | 8/1999 | Vince | |
| 5,957,472 A * | 9/1999 | Borgatti | 280/30 |
| 6,102,369 A | 8/2000 | Monger | |
| 6,152,462 A * | 11/2000 | Barrett | 280/30 |
| 6,182,935 B1 | 2/2001 | Talesky | |
| 6,328,319 B1 * | 12/2001 | Stahler, Sr. | 280/47.18 |
| 6,345,829 B1 * | 2/2002 | Mueller | 280/47.18 |
| 6,360,797 B1 | 3/2002 | Brazell et al. | |
| 6,386,119 B1 | 5/2002 | Lin | |
| 6,471,220 B1 | 10/2002 | Babb | |
| 6,530,583 B1 * | 3/2003 | Mueller | 280/47.18 |
| 6,578,856 B2 * | 6/2003 | Kahle | 280/30 |
| D486,504 S | 2/2004 | Huang | |
| 6,752,091 B2 | 6/2004 | Glover et al. | |
| 6,886,836 B1 * | 5/2005 | Wise | 280/30 |
| 6,892,860 B2 | 5/2005 | Gibson et al. | |
| 6,899,306 B1 | 5/2005 | Huang | |
| 6,942,229 B2 | 9/2005 | Brazell et al. | |
| D519,747 S | 5/2006 | Wu | |
| D523,041 S | 6/2006 | Wise | |
| 7,059,616 B2 | 6/2006 | Wu | |
| 7,077,421 B2 * | 7/2006 | Wu | 280/645 |
| 7,182,302 B2 * | 2/2007 | Noniewicz | 248/164 |
| 7,213,829 B2 * | 5/2007 | Wu | 280/645 |
| 7,222,865 B2 | 5/2007 | Chen et al. | |
| 7,255,355 B2 * | 8/2007 | Chisholm et al. | 280/30 |
| 7,278,646 B2 * | 10/2007 | Chuang | 280/47.34 |
| 7,308,858 B2 | 12/2007 | Lo et al. | |
| 7,334,592 B2 | 2/2008 | Tartaglia | |
| D566,735 S * | 4/2008 | Wise | D15/141 |
| 7,464,956 B2 | 12/2008 | Chen et al. | |
| 7,481,142 B2 * | 1/2009 | Kelly | 83/581 |
| 7,487,947 B2 | 2/2009 | Liu et al. | |
| 7,494,149 B2 | 2/2009 | Liu et al. | |
| D594,042 S * | 6/2009 | Wise | D15/141 |
| 7,648,155 B1 * | 1/2010 | Wise | 280/639 |
| 7,681,893 B2 | 3/2010 | Liu et al. | |
| 7,731,205 B2 * | 6/2010 | Wise | 280/47.131 |
| 7,757,999 B2 | 7/2010 | Zhang | |
| 7,815,215 B1 | 10/2010 | Lowe | |
| 7,819,111 B2 * | 10/2010 | Wise | 125/13.01 |
| 7,849,966 B2 | 12/2010 | Chiu | |
| 7,882,870 B2 * | 2/2011 | Lee | 144/286.1 |
| 8,464,994 B2 * | 6/2013 | Chiu | 248/439 |
| 2002/0125662 A1 * | 9/2002 | Magness | 280/30 |
| 2005/0011421 A1 | 1/2005 | Zhang | |
| 2005/0045781 A1 | 3/2005 | Brazell | |
| 2005/0120849 A1 | 6/2005 | Lee | |
| 2005/0120922 A1 | 6/2005 | Brooks | |
| 2005/0133682 A1 | 6/2005 | Huang | |
| 2005/0183559 A1 | 8/2005 | Rue | |
| 2005/0194215 A1 | 9/2005 | Radermacher | |
| 2005/0199768 A1 | 9/2005 | Tam et al. | |
| 2006/0011191 A1 | 1/2006 | Vavricek | |
| 2006/0021552 A1 | 2/2006 | Pleiman et al. | |
| 2006/0021553 A1 | 2/2006 | Pleiman et al. | |
| 2006/0071450 A1 | 4/2006 | Wu | |
| 2006/0076756 A1 | 4/2006 | Wu | |
| 2006/0145045 A1 | 7/2006 | Chisholm et al. | |
| 2006/0163441 A1 * | 7/2006 | Wise | 248/637 |
| 2007/0012826 A1 | 1/2007 | Liu et al. | |
| 2007/0080488 A1 | 4/2007 | Chuang | |
| 2007/0102892 A1 | 5/2007 | Chiu | |
| 2007/0197139 A1 * | 8/2007 | Wise | 451/41 |
| 2008/0067300 A1 * | 3/2008 | Liu et al. | 248/166 |
| 2008/0115701 A1 | 5/2008 | Sugiura | |
| 2009/0079152 A1 * | 3/2009 | Wise | 280/47.24 |
| 2009/0133780 A1 * | 5/2009 | Lee | 144/286.5 |
| 2009/0211419 A1 * | 8/2009 | Wise | 83/169 |
| 2010/0096530 A1 * | 4/2010 | Chiu | 248/439 |
| 2010/0213148 A1 | 8/2010 | Chen | |
| 2010/0229767 A1 | 9/2010 | Chiu | |

FOREIGN PATENT DOCUMENTS

| | | |
|---|---|---|
| EP | 0 532 132 A2 | 3/1993 |
| GB | 2 363 366 A | 12/2001 |
| WO | WO 03064115 A1 | 8/2003 |

\* cited by examiner

FOLDING TOOL STAND

CROSS-REFERENCE TO RELATED APPLICATION

This application is a continuation application of U.S. patent application Ser. No. 12/603,607, filed Oct. 22, 2009, and hereby incorporated by reference. U.S. patent application Ser. No. 12/603,607 claims the benefit of U.S. Provisional Application No. 61/159,271, filed Mar. 11, 2009, and U.S. Provisional Application No. 61/144,317, filed Jan. 13, 2009.

FIELD OF THE INVENTION

The present invention generally relates to tool stands provided for supporting power tools thereon, and more particularly, to a folding tool stand that can be easily and conveniently set between a collapsed, non-use or storage position, and an extended or supporting position.

BACKGROUND

Taiwan Patent Number M273664 discloses a collapsible tool stand, which comprises a platform, and a plurality of legs pivotally connected to the platform. When the collapsible tool stand is extended, multiple first locking devices are used to lock the legs in the extended position. When the collapsible tool stand is collapsed, multiple second locking devices are used to lock the legs in the collapsed position.

When the collapsible tool stand is in the collapsed position, the legs are received along the bottom side of the platform. Thus, the collapsible tool stand is maintained and supported in a flat manner on the floor. When it is desired to extend the collapsible tool stand from the collapsed position, the user must bend over or squat so that the user's hands can reach the legs of the collapsible tool stand and move the legs from the collapsed position to the extended position. However, a heavy tool (for example, a table saw) may be provided at the top side of the platform. Thus, when collapsing or extending the collapsible tool stand, an increased effort is required to manipulate the collapsible tool stand, and there is a substantial risk of injury to the user during the collapsing or extending of the collapsible tool stand.

SUMMARY

In view of the above discussion, embodiments of a folding tool stand that can be easily and conveniently set between a collapsed, non-use or storage position, and an extended or supporting position, while reducing the risk of injury to the user, are described.

In a first embodiment, a folding tool stand includes a platform, a base frame connected to a first side of the platform in a pivotal manner, links pivotally connected at each end to a second side of the platform and to the base frame respectively, and a leg support pivotally connected at top ends of first and second legs thereof to the base frame.

The base frame is connected to the first side of the platform in a pivotal manner via sliding sleeves that slide along the supports of the base frame, while allowing the platform to pivot with respect to the base frame. Springs can be provided on the supports of the base frame to bias the sliding sleeves towards an extended position of the folding stand.

In the extended support position of the folding stand, the links provide structural support to maintain the platform in a generally level, supporting configuration, such that the platform is spaced from the base frame. When the folding stand is collapsed, the links allow the platform to pivot with respect to the base frame, such that the platform lies against the base frame when the folding stand is in the collapsed position.

At least one locking device can be provided for locking the platform in the supporting position, such that release of the locking device will allow the platform to be moved from the supporting position spaced from the base frame to a collapsed position along the base frame.

The base frame can also include a transverse handle and wheels to allow the folding stand (and tool supported thereon) to be easily transported when the folding stand is in the collapsed position.

A retaining device can also be provided on the base frame to retain the leg support along the base frame when the folding stand is in the collapsed position.

In an alternate configuration, the biasing springs are not provided, the handle is configured as two extending handle portions instead of a transverse handle, and a driving device can be provided in connection with the links to allow the user to drive the platform from the collapsed position, along the base frame, to the support position, spaced from the base frame.

Additionally, the retaining device retains the platform in the collapsed position along the base frame, as well as the leg support in the collapsed position along the base frame.

By way of the above-described configurations, the embodiments of folding tool stands disclosed herein provide an excellent supporting effect. Further, in one of the described embodiments, when the folding tool stand is in the collapsed position, the base frame is configured to stand upright, so that the user does not need to bend over to manipulate the folding tool stand from the collapsed position to the extended support position. Thus, the risk of bodily injury is substantially reduced. In the other described embodiment, the folding tool stand is configured so that the user can utilize a driving device operated by the user's foot to expand and collapse the stand, so that excessive bending of the user's body is reduced.

BRIEF DESCRIPTION OF THE DRAWINGS

These and other features, aspects, and advantages of the present invention will become better understood with regard to the following description, appended claims, and accompanying drawings where:

Figure 1:
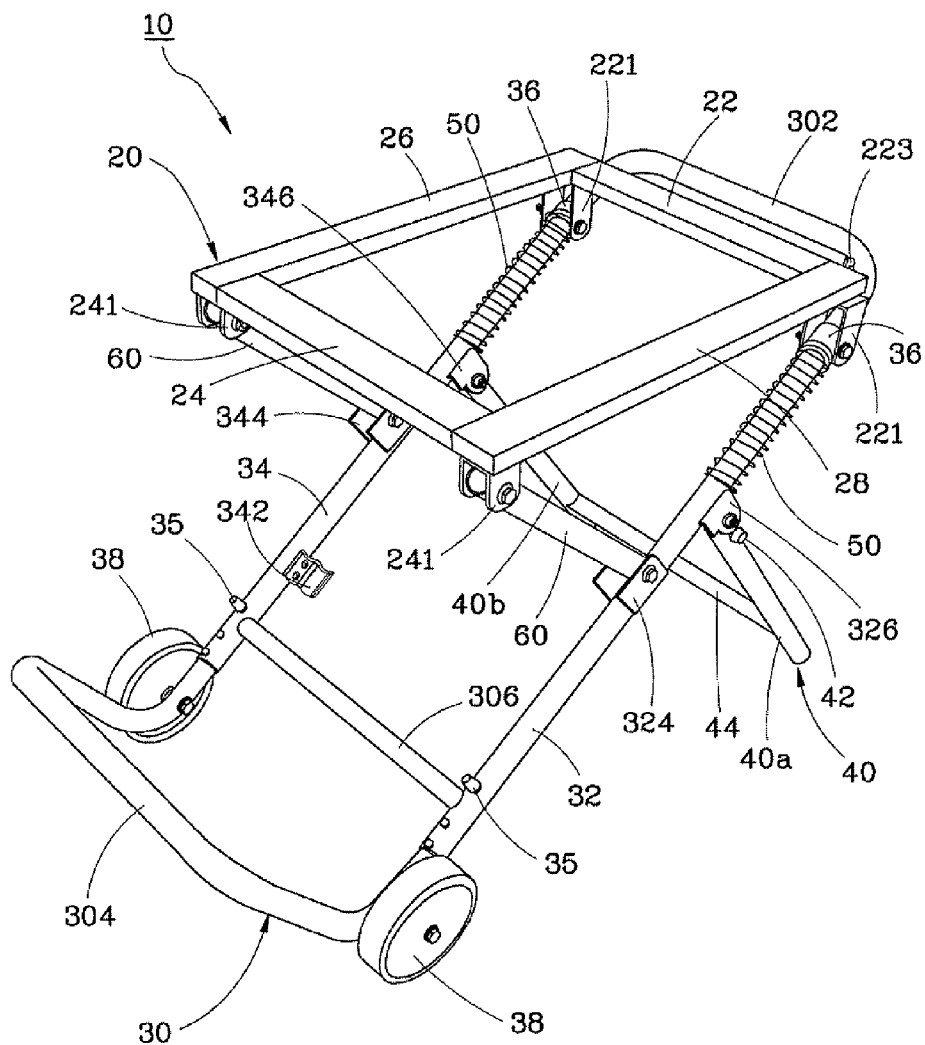
FIG. 1 is an oblique elevational view of a folding tool stand in accordance with a first embodiment of the present disclosure.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary embodiments of a folding tool stand and the components thereof, and in no way limit the structures or configurations of a folding tool stand and components thereof according to the present disclosure.

DETAILED DESCRIPTION

A. First Embodiment of a Folding Tool Stand

A first embodiment of a folding tool stand 10 according to the present disclosure is shown in FIGS. 1-5. The folding tool stand 10 generally includes a platform 20 supported on a base frame 30 for relative movement with respect thereto.

The platform 20 is adapted to support a tool (not shown) on an upper support surface defined by the platform 20. The supported tool can be any suitable tool, for example, a table top tool, such as a table saw, miter saw, scroll saw, band saw, drill press, belt or rotary sander, or any other tool suitable for being supported on a folding tool stand as disclosed herein.

The platform 20 forms the tool supporting surface via a first side 22, a second side 24, a third side 26, and a fourth side 28. The platform 20 can be formed in any suitable shape, such as, for example, rectangular or square. The platform 20 includes pivot holders 221 at the first side 22 thereof, and pivot holders 241 at the second side 24 thereof. The platform 20 is supported on a base frame 30 for relative movement with respect thereto in a manner more fully described below.

As best seen in FIG. 1, the base frame 30 includes two generally parallel support rods 32, 34 that define two sides of the base frame 30. A generally transverse handle 302 is provided extending between the support rods 32, 34 at the top ends thereof to allow a user to maneuver the folding tool stand 10 in the collapsed position, or in a partially extended position.

A first transverse rod 306 is connected between the support rods 32, 34 near their bottom ends to reinforce the structural strength of the base frame 30. Two wheels 38 are respectively connected to the bottom ends of the support rods 32, 34 in a rotatable manner for supporting the folding tool stand 10 on a floor, so that in the collapsed position, the folding tool stand 10 can be translated along the surface of the floor with ease.

Figure 5:
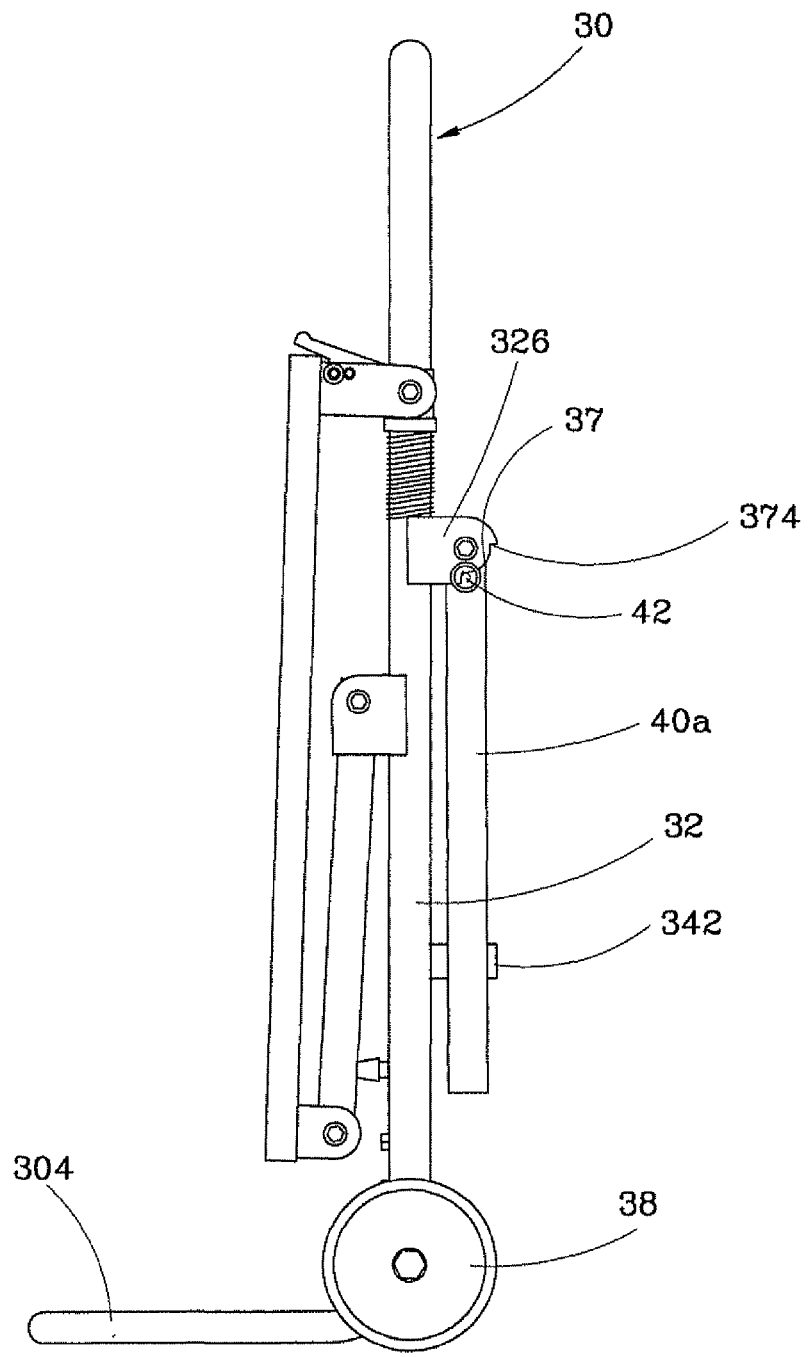
FIG. 5 is a side view of the folding tool stand of FIG. 1, showing the leg support retained against the base frame.
Figure 6:
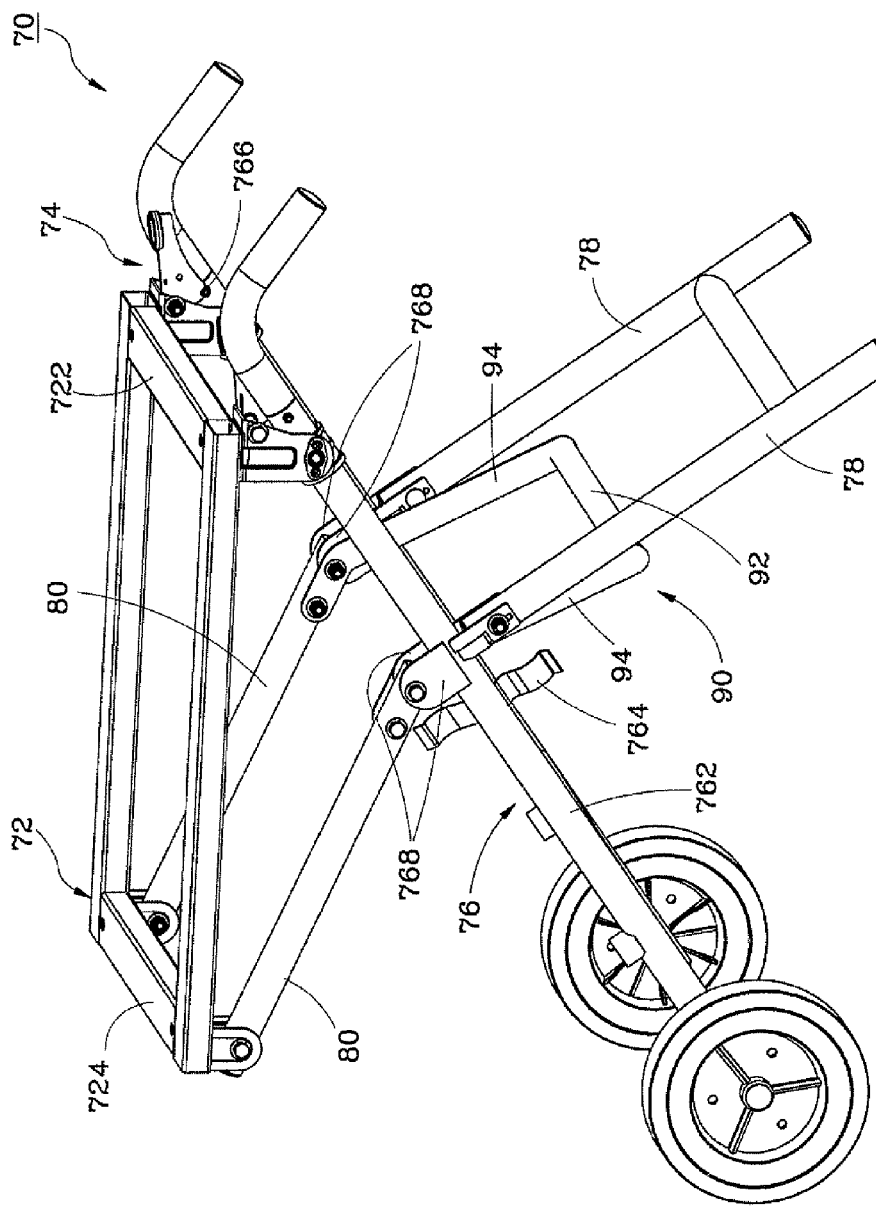
FIG. 6 is an oblique elevation of a folding tool stand in accordance with a second embodiment of the present disclosure.
Figure 7:
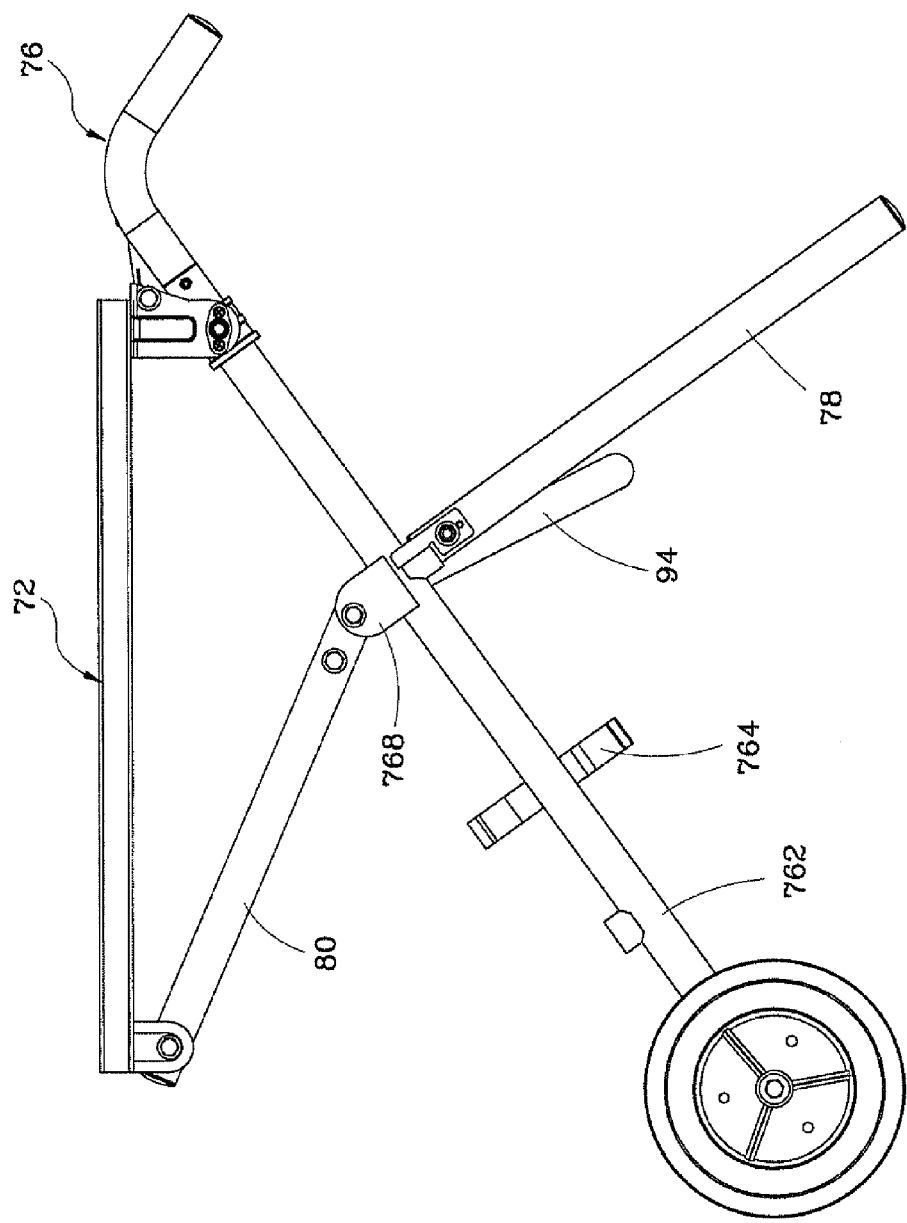
FIG. 7 is a side view of the folding tool stand in FIG. 6, showing the folding stand in the extended supporting position.
Figure 8:
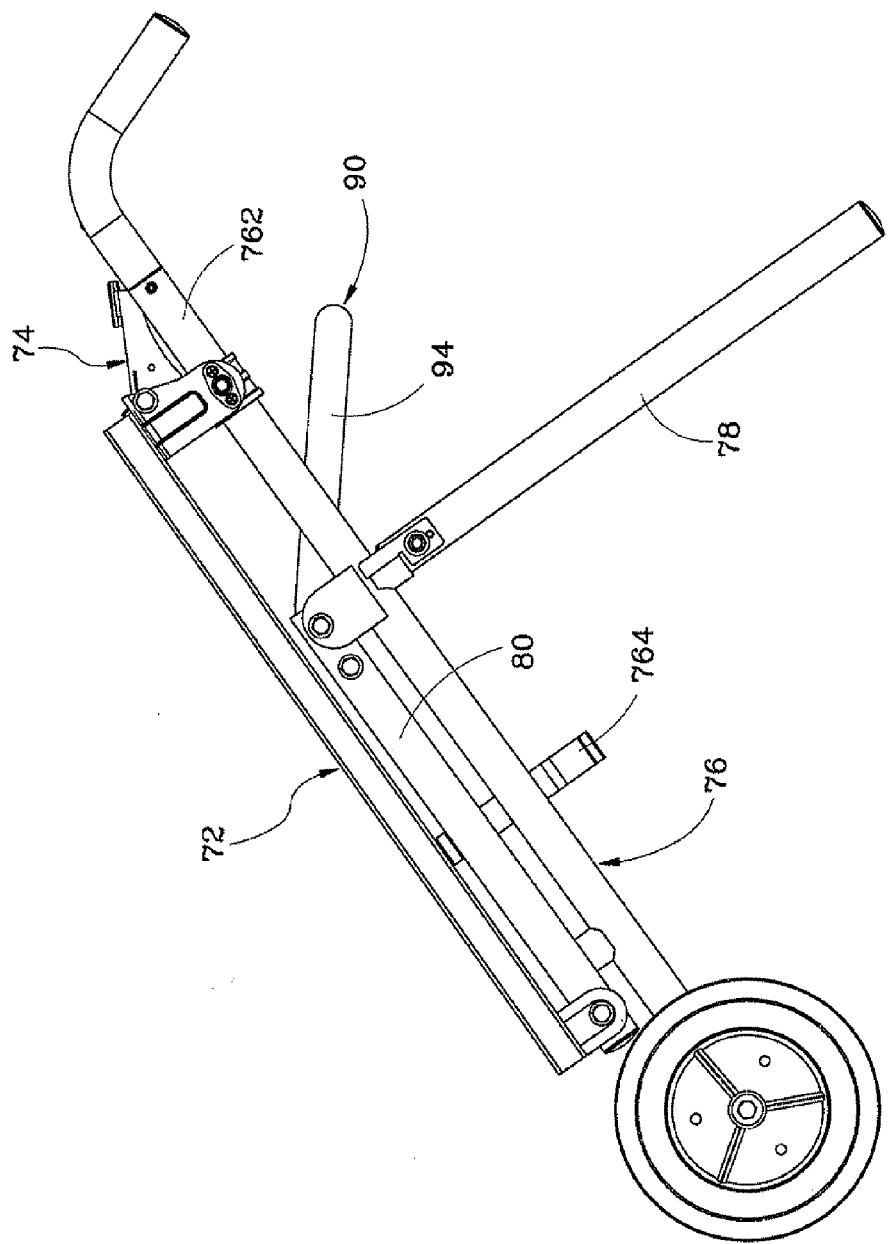
FIG. 8 is a side view of the folding tool stand in FIG. 6, showing the first side of the platform in the collapsed position along the base frame.
Figure 9:
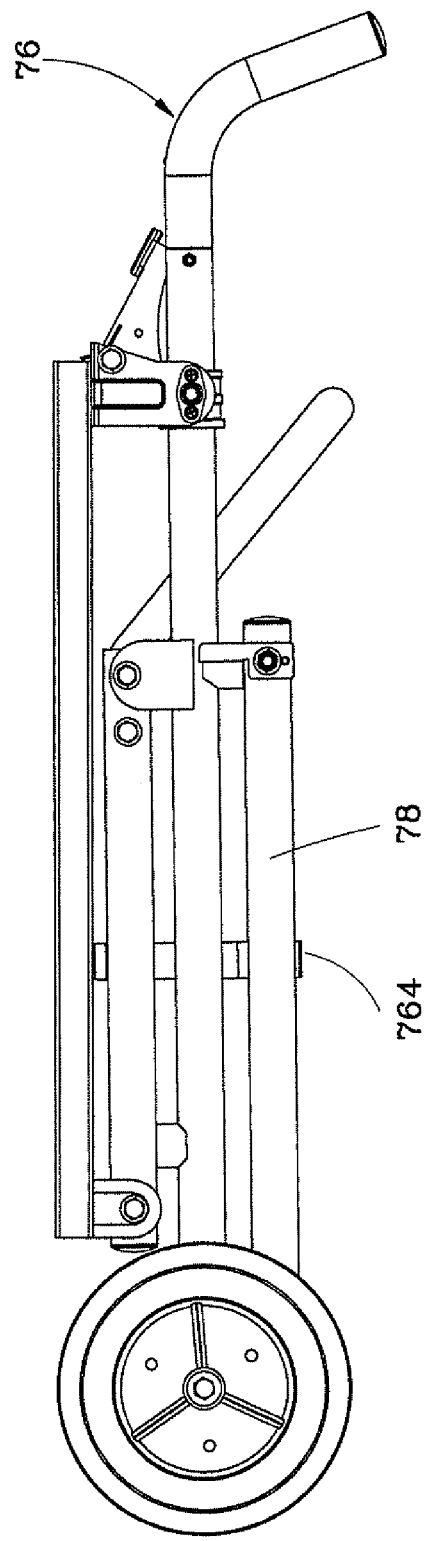
FIG. 9 is a side view of the folding tool stand in FIG. 6, showing the folding tool stand in the collapsed position.

A floor bar 304 is transversely connected between the bottom ends of the support rods 32, 34 at a predetermined angle for allowing the folding tool stand 10 to stand upright when the folding tool stand 10 is in the collapsed position, as can be seen in FIG. 5.

The support rods 32, 34 also include first pivot holders 326, 346 and second pivot holders 324, 344 thereon generally along a middle portion of the support rods 32, 34. Spring members 50 are also coaxially provided along the support rods 32, 34 between the first pivot holders 326, 346 and sliding sleeves 36.

Figure 2:
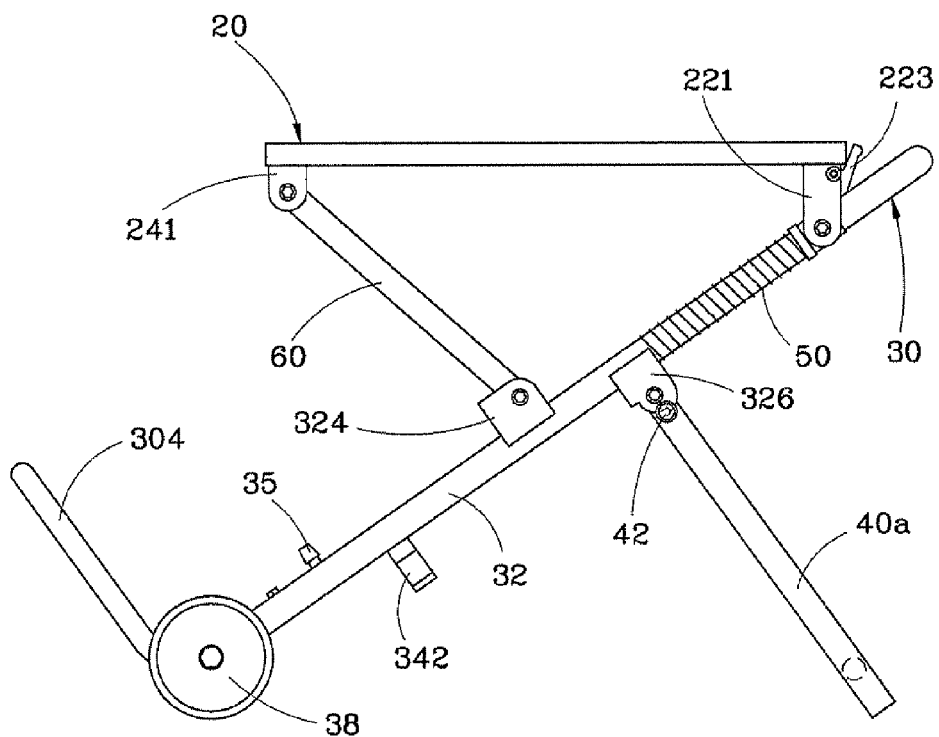
FIG. 2 is a side view of the folding tool stand of FIG. 1, showing the folding tool stand set in the extended supporting position.
Figure 3:
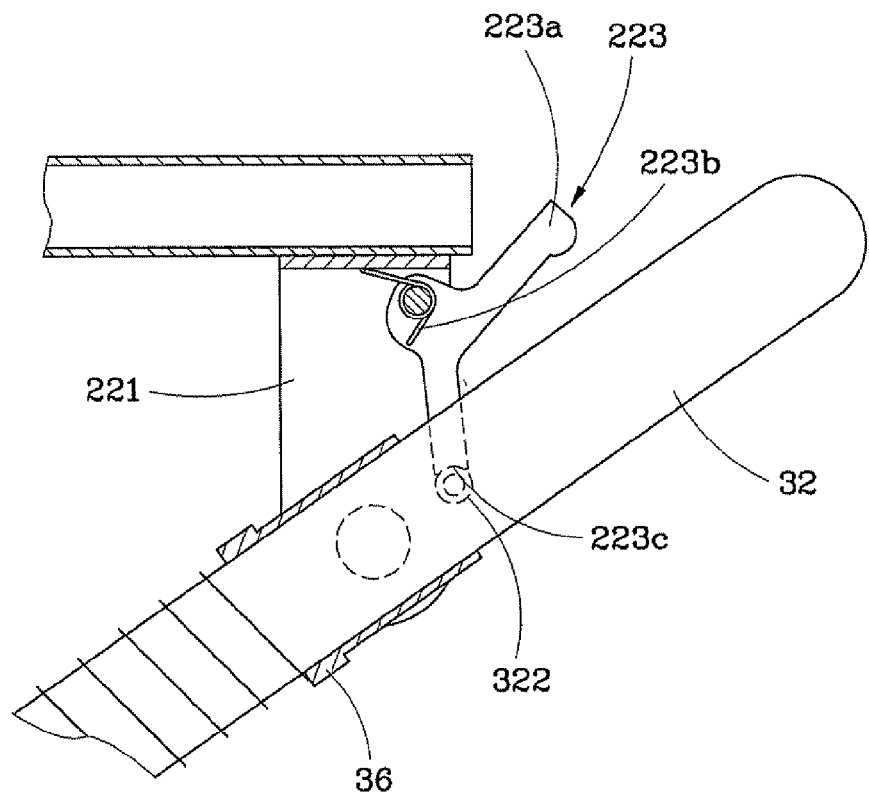
FIG. 3 is a sectional view in an enlarged scale of a part of the folding tool stand in FIG. 2, showing a locking device engaged with a protrusion of the base frame.

As can be seen in FIGS. 1-3, the platform 20 is connected to the base frame 30 at the first side 22 by the pivot holders 221, which are pivotally coupled to the sliding sleeves 36. Thus, the platform 20 is pivotally and slidably connected at the first side 22 thereof to the base frame 30. The platform 20 is connected to the base frame 30 at the second side 24 by the pivot holders 241, which are pivotally coupled to upper ends of links 60. Lower ends of the links 60 are pivotally coupled to the second pivot members 324, 344 on the base frame 30.

Thus, the links 60 are pivotally coupled between the second side 24 of the platform 20 and the base frame 30 such that the links 60 guide and support the second side 24 of the platform spaced away from the base frame 30 when the folding tool stand 10 is in the supporting position, and the links 60 further guide and support the second side 24 of the platform 20 adjacent to the base frame 30 when the folding tool stand 10 is in the collapsed position. Cushion blocks 35 are provided on the support rods 32, 34 to provide a cushion between the links 60 and the support rods 32, 34, when the folding tool stand 10 is collapsed.

Figure 4:
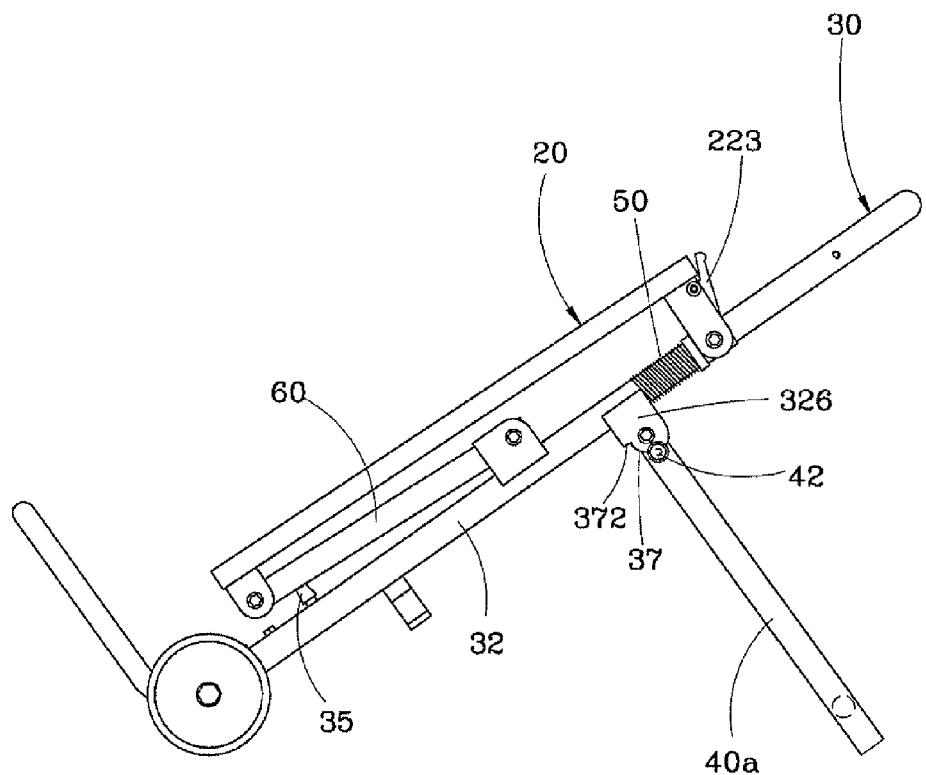
FIG. 4 is side view of the folding tool stand of FIG. 1, showing the first side of the platform in the collapsed position along the base frame.

As best seen in FIGS. 2 and 4, this configuration allows the platform 20 to be manipulated back and forth from a collapsed, storage position to an extended support position. The spring members 50 bias the sliding sleeves 36 towards the upper ends of the support rods 32, 34. Thus, once the user lifts the second side 24 of the platform 20 beyond a break point, the spring members 50 urge the platform 20, via the sliding sleeves 36, into the extended supporting position. This feature can help a user to extend the folding tool stand 10, even when a heavy tool is supported thereon.

As shown in FIGS. 2 and 3, in order to maintain the platform 20 in the extended, supporting position, at least one locking device 223 is pivotally connected to one of the pivot holders 221 at the first side 22 of the platform 20. The locking device 223 has a handle 223a pivotally connected to the pivot holder 241, and a smoothly arched stop end 223c at one end thereof. A return spring 223b is provided between the locking device 223 and the pivot holder 241. Further, a corresponding support rod (as shown, support rod 32) has a first protrusion 322 bilaterally protruded near the top end thereof for abutting the smoothly arched stop end 223c of the locking device 223, such that the locking device 223 can selectively engage the first protrusion 322.

When the platform 20 is moved into the extended supporting position, the smoothly arched stop end 223c of the locking device 223 passes over and engages the first protrusion 322. Once the first protrusion 322 is in abutment with the smoothly arched stop end 223c of the locking device 223, the platform 20 is locked in the extended supporting position to provide a stable support for the supported tool.

When it is desired to lower the platform to the collapsed, storage position, the user manipulates the handle 223a of the locking device 223 against the bias of the return spring 223b in order to disengage the abutment of the smoothly arched stop end 223c of the locking device 223 and the first protrusion 322. Once the abutment is removed, the platform 20 can be lowered, against the bias of the spring members 50, to the collapsed, storage position.

As shown in FIGS. 1, 2, 4, and 5, a leg support 40 connected to the base frame 30 is formed of two generally parallel legs 40a, 40b having a second transverse rod 44 positioned therebetween for increased structural support. The leg support 40 is configured to be swung from a collapsed, storage position along the base frame 30 (FIG. 5) to an extended support position (FIGS. 1, 2, 4) for engagement with a supporting surface, such as the floor. The movement of the leg support 40 is accomplished by having the top ends of the legs 40a, 40b pivotally connected to the base frame at the respective first pivot holders 326, 346, which are positioned generally along the middle portion of the respective support rods 32, 34.

In order to provide stable and reproducible support for the supported tool, the first pivot holders 326, 346 have a notch 37 therein, which has a first end portion 372 and a second end portion 374, as shown in FIGS. 4 and 5. Each leg 40a, 40b has a screw fastened to the top end thereof, forming a second protrusion 42 for abutting against the second end portion 374 of the notch 37 of the first pivot holder 326, 346 of the support rods 32, 34 to hold the legs 40a, 40b in the extended position. Thus, the leg support 40 is positioned in the same orientation each time the folding tool stand 10 is expanded to the extended supporting position.

When the legs 40a, 40b are moved to the collapsed, storage position, the second protrusions 42 of the legs 40a, 40b are moved therewith toward the base frame 30 and come into close contact with the first end portions 372 of the notches 37 of the first pivot holders 326, 346 to position the legs 40a, 40b along the base frame 30.

As shown in FIGS. 1, 2, and 5, a retaining device 342 is provided near a bottom end of at least one support rod (as shown, support rod 34) to selectively engage at least one leg (as shown, leg 40b) of the leg support 40 to retain the leg support 40 in the collapsed, storage position.

When the leg support 40 is extended to the support position, the folding tool stand 10 is supported on the supporting surface, such as the floor, by the wheels 38, and the bottom ends of the legs 40a, 40b. Since the bottom ends of the legs 40a, 40b do not have wheels thereon, the folding tool stand 10 is stably supported on the supporting surface.

From the above discussion, it can be seen that the leg support 40 is pivotable between a first position adjacent the base frame 30 when the folding tool stand 10 is in the collapsed position, and a second position spaced from the base frame 30 when the folding stand 10 is in the supporting position.

If it is desired to relocate the tool supported on the folding tool stand 10, the entire stand can be manipulated to the collapsed, storage position shown in FIG. 5. Alternatively, the leg support 40 can be collapsed to the storage position so that the folding tool stand 10 can be maneuvered using the wheels 38, which form the only points of contact between the folding tool stand 10 and the supporting surface when the leg support 40 is retained against the base frame 30 by the retaining device 342.

In use, when a user wishes to extend the folding tool stand 10 from the collapsed, storage position to the extended supporting position, the user can grasp the second transverse rod 44 and pull the leg support 40 away from the base frame 30. When this is done, the leg of the leg support 40 that is retained by the retaining device 342 will disengage from the retaining device 342. The leg support 40 is moved until the second protrusions 42 on the legs 40a, 40b abut against the second end portions 374 of the notches 37 of the first pivot holders 326, 346.

Next, the second side 24 of the platform 20 is grasped and lifted such that the first side 22 of the platform 20 moves upwardly along the support rods 32, 34 via the sliding sleeves 36. At this time, the spring members 50 impart a biasing force to the platform 20, enabling the user to move the platform 20 to a second, extended supporting position with less effort. When the platform 20 reaches the extended supporting position, the sliding sleeve 36 is stopped in abutment against the first protrusion 322 of the support rod 32. Further, the links 60 support the platform 20, enabling the second side 24 of the platform 20 to be supported by the links 60 in a position spaced from the base frame 30.

Lastly, as previously discussed, the smoothly arched stop end 223c of the locking device 22 is stopped in abutment against the first protrusion 322 of the support rod 32, thus locking the platform 20 in position. Therefore, the folding tool stand 10 is maintained in the extended supporting condition.

To collapse the folding tool stand 10 to the storage position, a user manipulates the handle 223a to disengage the smoothly arched stop end 223c of the locking device 223 from the first protrusion 322 of the support rod. Next, the user pushes down the second side 24 of the platform 20 to collapse the links 60 against the base frame 30. At this time, the cushion blocks 35 of the support rods 32, 34 buffer the down stroke of the links 60. At the same time, the first side 22 of the platform 20 is moved along the support rods 32, 34 downwards to a first, collapsed position. Concurrently, the sliding sleeves 36 are forced to compress the spring members 50 which impart a resisting force to the first side 22 of the platform 20 to smooth the downward movement of the platform 20 until the second side 24 of the platform 20 lies along the base frame 30.

At this time, due to the movement of the sliding sleeves 36 towards the first pivot holders 326, 346, which compresses the spring members 50, the center of gravity of the platform 20 and the supported tool is relatively lowered, as shown in FIG. 4, facilitating smooth movement and vertical positioning of the folding tool stand 10. Thereafter, the legs 40a, 40b are moved toward the base frame 30 such that the leg 40b is forced into engagement with the retaining device 342, as previously discussed.

Thus, the folding tool stand 10 provides a quick and easy way to extend and collapse the stand for supporting a tool thereon while reducing the risk of injury associated with excessive bending of the user's body.

B. Second Embodiment of a Folding Tool Stand

A second embodiment of a folding tool stand 70, similar to folding tool stand 10 described above, is shown in FIGS. 6-9. The folding tool stand 70 has a generally similar construction as the folding tool stand 10, and a description of similar features is not provided. The folding tool stand 70 eliminates the spring members of the folding tool stand 10, and instead, provides an additional driving device 90, described in detail below. The folding tool stand 70 also includes two generally parallel handles, in contrast to the transverse handle 302 of the folding tool stand 10. The folding tool stand 70 also does not include a floor bar, but rather, includes wheels that support the folding tool stand 70 on a supporting surface.

Similarly to folding tool stand 10, the folding tool stand 70 includes a platform 72 having a first side 722 pivotally and slidingly connected to a base frame 76 formed of generally parallel support rods 762, and a second side 724 pivotally connected to links 80, which are pivotally connected to the base frame 76. The base frame 76 also includes a leg support 78 pivotally connected thereto. A locking device 74 of a similar type as described above is provided between the platform 72 and the base frame 76 to lock the platform 72 in an extended supporting position.

Also similarly to folding tool stand 10, the support rods 762 carry second pivot holders 768, to which second ends of the links 80 are pivotally connected. The support rods 762 also carry at least one first protrusion 766 configured to selectively engage the locking device 74, in a manner discussed above.

As shown in FIGS. 6-9, at least one retaining device 764 is provided to selectively engage a link 80 and/or a leg of the leg support 78 to retain the platform 72 and leg support 78 in the collapsed, storage position against the base frame 76.

The operation of the folding tool stand 70 is generally the same as described above with respect to the folding tool stand 10. A difference lies in the driving device 90, which includes a transverse pedal 92 connected to two generally parallel side bars 94.

The side bars 94 are respectively pivotally connected to the second pivot holders 768 of the support rods 762 of the base frame 76. The side bars 94 also have extending portions (top ends) that extend past the second pivot holders 768 and are fixedly connected with respective links 80. Therefore, the side bars 94 are pivotally connected with the links 80 to the base frame 76. The bottom ends of the side bars 94 are respectively fixedly connected to the two distal ends of the pedal 92. The distance between the second pivot holders 768 of the base frame 76 and the top ends of the side bars 94 that extend beyond the second pivot holders 768 is shorter than, for example about ⅕~⅓, of the distance between the bottom ends of the side bars 94 and the second pivot holders 768 of the base frame 76.

In order to extend the folding tool stand 70 from the collapsed, storage position to the expanded supporting position, a user releases the leg support 78 from engagement with the retaining device 764. The leg support 78 is then swung away from the base frame 76 to provide a support for the folding tool stand 70 on a supporting surface.

Next, the user places a foot against the pedal 92 of the driving device 90 and applies force thereto in order to cause the links 80 to move upwards and lift the second side 724 of the platform 72 from the base frame 76 into the extended position. While the second side 724 of the platform 72 is being lifted, the first side 722 of the platform 72 is raised along the support rods 762 (in the same manner as discussed above).

As the first side 722 of the platform 72 is being lifted, the locking device 74 will engage the first protrusion 766 of the support rod 762 to lock the platform 72 in the extended, supporting position.

In order to collapse the folding tool stand 70 from the expanded supporting position to the collapsed, storage position, the steps above are generally reversed. First, though, a user places a foot on the pedal 92 of the driving device 90 to impart a supporting force through the links 80 to the second side 724 of the platform 72. Once the supporting force is provided, the user can safely release the engagement of the locking device 74 and the first protrusion 766. Then, the user can gently release the supporting force supplied by the driving device 90 such that the second side 724 of the platform 72 will collapse towards the base frame 76. Once the platform 72 is collapsed to the storage position against the base frame 76, the leg support 78 can be moved into engagement with the retaining device 764 to maintain the folding tool stand 70 in the collapsed, storage position.

Thus, the folding tool stand 70 provides a quick and easy way to extend and collapse the stand for supporting a tool thereon while reducing the risk of injury associated with excessive bending of the user's body.

C. Conclusion

It will be recognized that the folding tool stand and components thereof can be made from any suitable materials.

It is understood that the size of the folding tool stand can be adjusted so that different sized tools can be supported.

It will also be recognized that the position of components provided on one side of the folding tool stand can be switched, or duplicated on the other side of the folding tool stand. For example, the retaining device can be provided on the other support rod from what is illustrated, or on both support rods.

Of course, it is to be understood that not necessarily all objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The skilled artisan will recognize the interchangeability of various disclosed features from the disclosed embodiments and variations. In addition to variations described herein, other known equivalents for each feature can be mixed and matched by one of ordinary skill in this art to construct a folding tool stand in accordance with principles of the present invention.

Although this invention has been disclosed in the context of exemplary embodiments and examples, it therefore will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above.

What is claimed is:

1. A folding tool stand, comprising:
    a base frame having a top end and a bottom end, and including a pair of first pivot holders outwardly extending therefrom and a pair of second pivot holders outwardly extending therefrom in a direction opposite to that of the first pivot holders;
    a leg support having a top end pivotally connected to the base frame between the top and bottom ends thereof by the pair of first pivot holders, wherein the leg support is pivotable between a first position adjacent the base frame when the folding stand is in a fully collapsed position, and a second position spaced from the base frame when the folding stand is in an extended supporting position;
    a platform supported on the base frame for relative movement with respect thereto, the platform having a first side pivotally and slidingly connected to the base frame and a second side opposed to the first side, wherein the first side is slidable along the base frame in the direction toward the top end of the leg support when the platform is changed to the collapsed position, and wherein the leg support is independently adjustable relative to the platform;
    a pair of links pivotally coupled between the second side of the platform and the base frame, wherein the links guide and support the second side of the platform spaced away from the base frame when the folding stand is in the supporting position, and the links guide and support the second side of the platform adjacent the base frame when the folding stand is in the collapsed position;
    a driving device operable to move the pair of links relative to the base frame and having a pair of side bars, each side bar pivotally coupled together with one of the respective links to one of the second pivot holders of the base frame, and each side bar further having a top end extending past the second pivot holders and fixedly connected to one of the respective links.

2. The folding tool stand according to claim 1, wherein the base frame includes a first support rod and a second support rod, said first and second support rods each having one of the first pivot holders thereon, and said first and second support rods each having one of the second pivot holders thereon.

3. The folding tool stand according to claim 2, wherein the first side of the platform is pivotally and slidingly connected to the first and second support rods.

4. The folding tool stand according to claim 2, wherein the leg support comprises a pair of legs pivotally connected at top ends thereof to the respective first pivot holders.

5. The folding tool stand according to claim 4, wherein the base frame further comprises at least one retaining device mounted on one support rod for selectively securing one leg of the leg support to prevent movement of the leg support with respect to the base frame.

6. The folding tool stand according to claim 4, further comprising a transverse rod connected between the legs of the leg support.

7. The folding tool stand according to claim 2, further comprising a locking device positioned on the first side of the platform and arranged to selectively engage a protrusion positioned on one of the support rods to lock and maintain the platform in an extended position.

8. The folding tool stand according to claim 7, wherein the locking device comprises:
   a handle;
   a smoothly arched stop end for abutting against the protrusion; and
   a return spring adapted for imparting a biasing force to the locking device relative to the platform.

9. The folding tool stand according to claim 2, further comprising at least one pivot holder downwardly extending from the first side of the platform and pivotally coupled to a respective sliding sleeve slidingly received on the base frame, said at least one pivot holder including a locking device arranged to selectively engage a protrusion positioned on one of the support rods to lock and maintain the platform in an extended position.

10. The folding tool stand according to claim 9, wherein the locking device comprises:
    a handle;
    a smoothly arched stop end for abutting against the protrusion; and
    a return spring adapted for imparting a biasing force to the locking device relative to the platform.

11. The folding tool stand according to claim 2, further comprising two wheels respectively pivotally mounted near a bottom end of each said support rod.

12. The folding tool stand according to claim 2, further comprising at least one cushion block mounted on one of the support rods for cushioning a corresponding link of the pair of links when the platform is moved adjacent to the base frame when the folding stand is in the collapsed position.

13. The folding tool stand according to claim 1, wherein the driving device further comprises a pedal having two distal ends respectively connected to a bottom end of each of the side bars.

14. The folding tool stand according to claim 13, wherein the driving device includes a bent portion on each side bar separating the top and bottom ends of each side bar, such that applying force to the pedal correspondingly urges the links and the platform from the collapsed position to the supporting position.

15. The folding tool stand according to claim 13, wherein a distance between the respective top ends of the side bars of the driving device and the second pivot holders is shorter than a distance between respective bottom ends of the side bars and the second pivot holders.

16. The folding tool stand according to claim 15, wherein the distance between the respective top ends of the side bars of the driving device and the second pivot holders is about $1/5 \sim 1/3$ of the distance between the respective bottom ends of the side bars of the driving device and the second pivot holder.

17. The folding tool stand according to claim 1, further comprising a pair of pivot holders downwardly extending from the first side of the platform and pivotally coupled to a respective pair of sliding sleeves slidingly received on the base frame, wherein movement of the sliding sleeves toward the first pivot holders collapses the platform toward the base frame and allows a center of gravity of the folding tool stand to be lowered.

18. The folding tool stand according to claim 1, wherein the base frame further comprises at least one handle disposed at the top end thereof.

\* \* \* \* \*